No. 11,701. Reissued Nov. 8, 1898.
J. H. COUPER & T. A. BRYAN.
ACETYLENE GAS GENERATOR.
(Application filed July 29, 1898.)
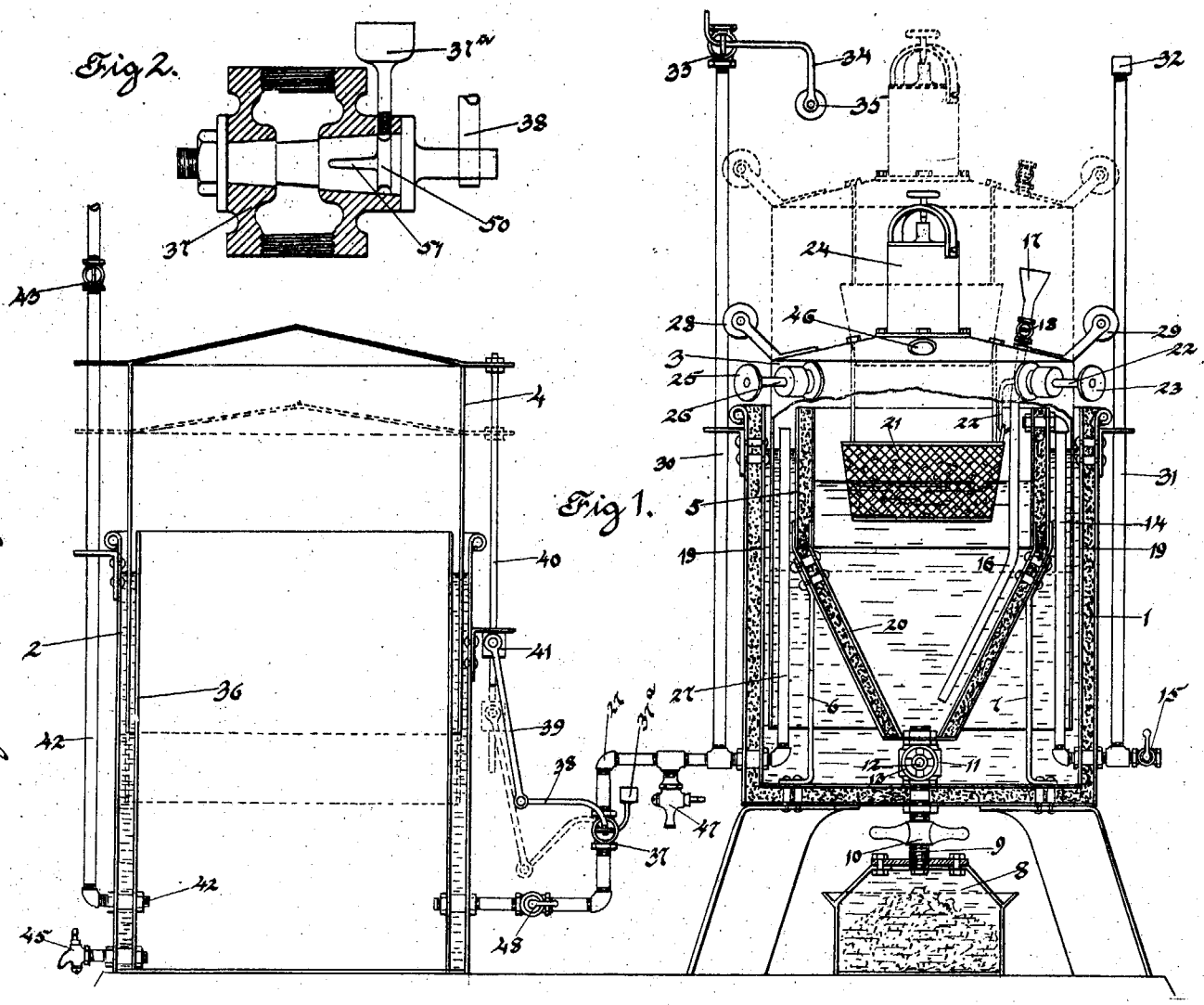
Witnesses
Wm. W. Handy
M. R. Jones
James H. Couper
Thomas A. Bryan
Inventors
by Stewart & Stewart
Attorney

UNITED STATES PATENT OFFICE.

JAMES H. COUPER AND THOMAS A. BRYAN, OF BALTIMORE, MARYLAND.

ACETYLENE-GAS GENERATOR.

SPECIFICATION forming part of Reissued Letters Patent No. 11,701, dated November 8, 1898.

Original No. 605,398, dated June 7, 1898. Application for reissue filed July 29, 1898. Serial No. 687,242.

*To all whom it may concern:*

Be it known that we, JAMES H. COUPER and THOMAS A. BRYAN, citizens of the United States, and residents of the city of Baltimore, State of Maryland, have invented certain new and useful Improvements in Acetylene-Gas Generators, of which the following is a specification.

Our invention relates particularly to that class of generators in which acetylene gas is developed by the action of water on calcium carbid.

Generators of this class are often placed where they are subjected to a very low temperature; and our invention consists in part in certain details of construction by means of which the water contained in the generator is prevented from freezing and in other improvements which are fully explained in the following specification.

In the drawings, Figure 1 shows the generator, and Fig. 2 the details of an automatic self-oiling valve.

Referring to Fig. 1, 1 and 2 are gasometer-tanks, and 3 and 4 the movable parts or floats, which rise and fall according to the quantity of gas generated. Gasometer 2 is shown wholly in section and gasometer 1 partly in section in order to show plainly both the interior and exterior construction.

5 is a funnel-shaped tank which is filled with water to about the level shown in the drawings, and it is rigidly fastened to a tank 1 by means of the supporting-rods 6 and 7.

8 is a bucket placed under the gasometer 1 and connected to the vessel 5 by means of the pipe 9 and coupling 10. 11 is a valve placed in said pipe, which is opened and closed by a valve-stem 12 and hand-wheel 13, which extend beyond the outer shell of the tank 1. The coupling 10 is provided with handles by which it may be turned and the bucket 8 disconnected from the gasometer.

14 is a pipe which may be connected with a water-supply by the valve 15.

16 is a pipe leading from the top of the float 3 into the tank 5, and 17 a funnel through which water may be poured into 5 by way of the pipe 16. 18 is a valve placed in said pipe. This pipe 16 is used only when there is no suitable water-supply to be connected at 15. In case too much water should be poured into 5 the valve 15 may be opened and the water drained down to the level of the point where pipe 14 enters tank 5.

The tank 1 has an interior lining 19, the space between it and the outer shell being filled with magnesia or some other suitable substance which is a poor conductor of heat. The tank 5 also has an interior lining 20, the space between it and the outer shell being packed with the same substance. The space between tanks 1 and 5 is filled with oil (or some liquid with a low freezing temperature) to about the level shown in the drawings. In some cases we may dispense with the magnesia and simply have the air-spaces between the two shells of 1 and 5, air being itself a poor conductor of heat. The action of the water upon the carbid forming acetylene gas liberates the latent heat of the carbid and warms the water and the gas, and this action, together with the oil and magnesia packing, very thoroughly protects the water and makes the apparatus a non-freezing machine.

Suspended from the top of the float 3 is a perforated basket 21, holding the carbid.

22 is a rod extending from the basket to the outside of the float 3 and operated by the hand-wheel 23. By turning 23 back and forth the basket may be shaken and the residue left from the action of the water on the carbid caused to drop from the bottom of the basket, falling through the water into the bucket 8. It is not absolutely necessary for the successful operation of the generator to shake 21, as the residue will fall of its own accord into 8; but it might at certain times become caked in the bottom of the basket, and the shaker is used to provide against this. The basket, however, should be thoroughly shaken before a new charge of carbid is dropped into it, as there is always a certain amount of moist residue left in the basket, which if not shaken out would cause the fresh carbid to give off gas, even though it were not touching the water in 5.

24 is a receptacle in which carbid is placed before being dropped into the basket.

25 is a hand-wheel, and 26 a rod, by means of which the bottom of the receptacle may be removed and the carbid precipitated into the basket 21.

27 is the delivery-pipe for conducting the gas from gasometer 1 into gasometer 2.

28 and 29 are rollers which run on the pipes 30 and 31 as the float 3 rises or falls. The pipe 31 is simply used as a guide for one of the rollers and has a plug 32 on its upper end. Pipe 30, however, has a safety-valve 23 at the top, which normally is closed, as shown, but may be opened by the rod 34 when the float 3 rises and comes in contact with the roller 35.

Gasometer 2 is provided as an additional storage for gas, and in some cases is dispensed with entirely, the gas being taken directly from the gasometer 1. Gasometer 2 also has a double shell, the interior lining of which is 36. The space between the outer and inner shell is filled with oil (or some other suitable liquid having a low freezing temperature) to the level shown in the drawings. The float 4 rises and falls in the oil between the two shells of gasometer 2, as shown. Gas is conducted from gasometer 1 to gasometer 2 by the pipe 27, in which is an automatic valve 37. This valve is in motion a great part of the time and is also subjected to the high temperature of the gas. It is made self-oiling and has an oil-cup 37ª attached to it. This oil-cup performs the double duty of lubricating the valve and preventing corrosion or erosion by the action of the gas. 37 is opened and closed by the system of rods 38, 39, and 40, connected to the top of the float 4. The nut 41 on the rod 40 limits the upward motion of the float, said float being shown in its highest position in the figure. In this position the valve 37 is closed, and having a certain lap will not open until the float falls to a position shown by the dotted lines. The pipe 42 is the gas delivery from the gasometer 2, having a valve 43 for shutting off the supply when desired. This pipe also acts as a guide for the float 4; but this feature is not essential, as some other pipe or rod may be used for the same purpose.

45 is a drain-cock placed in the bottom of gasometer 2, so that any water which may collect from condensation either in gasometer 2 or the pipes connecting gasometer 1 and gasometer 2 may be drained off.

The float 3 has two glass ports placed in the top, so that the inside of the generator may be inspected. One of the ports 46 is shown, the other being directly opposite it, so that upon looking through one port the light admitted from the other one on the opposite side enables the observer to see clearly inside the float.

47 is a drain-cock placed in pipe 27, so that when only gasometer 1 is used, the supply of gas being taken directly from pipe 27 without passing through the gasometer 2, there is a means of draining off any condensed moisture which may have collected in the pipes. At certain times it may be necessary to close the pipe 27, connecting gasometers 1 and 2, in order to repair one or the other of the gasometers. The valve 48 is provided for this purpose.

Referring to Fig. 2, the construction of the valve 37 is shown. 37ª is the oil-cup, and 50 and 51 glands for admitting oil to the valve. We are aware that this construction of a lubricating device for a valve is not new; but its use in our acetylene-gas generator is new and essential, and the automatically-oiled valve coöperates with the automatic gas-generator to maintain the valve in working order under conditions which without the automatic oiler would clog the valve and stop the apparatus.

The operation of the generator is as follows: 5 is first filled with water from a source of supply connected at 15 or through the funnel 17 and pipe 16 if such a supply is not available. Carbid is placed in the receptacle 24, and the top having been fastened the bottom is removed by pulling out the rod 26 and the carbid dropped into the basket 21. If the basket is in contact with the water in 5, gas is immediately generated, filling both gasometers 1 and 2, since the valve 37 is open when the float 4 is down. As the supply of gas increases the floats 3 and 4 both rise, the float 3 raising the carbid out of the water to a position such as shown by the dotted line and stopping the generation of gas, and the float 4 when it reaches the position shown by the dotted lines closes the valve 37. If the generation of gas in gasometer 1 has been too rapid, the float 3 will rise and open the valve 33 and allow a certain quantity of gas to escape, thus preventing any undue pressure in gasometer 1. This, however, never happens unless all the carbid is dropped into the water due to the breaking of the basket. As the gas is drawn off from gasometer 2 through the delivery-pipe 42 float 4 falls and opens valve 37 again, admitting more gas into gasometer 2 from gasometer 1, thus keeping up the supply in gasometer 2. The gas will flow from gasometer 1 into gasometer 2 because the pressure per square inch in gasometer 1 is greater than in gasometer 2, due to the float 3 being heavier than the float 4. When a sufficient quantity of gas has been drawn from gasometer 1, the float 3 will fall to a position where the carbid in basket 21 comes in contact with the water, a further quantity of gas will be generated, and the supply kept up in gasometer 1. After the generator has been working a sufficient time to allow the bucket 8 to be filled with the residue of slaked lime the valve 11 is closed, coupling 10 unscrewed, and the bucket removed and the contents emptied. The bucket 8 and pipe 9 being both full of water when the coupling is unscrewed, some water will overflow, and the bucket 8 is provided with a rim, as shown, to catch this overflow.

It is not essential for the successful working of our generator that two gasometers be used, as gasometer 2 may be dispensed with and the gas drawn directly from pipe 27. We are aware that generators have heretofore been used in which the gas is generated by automatically bringing the carbid into contact with water, and we do not claim this, broadly, as part of our invention; but

What we claim, and desire to secure by Letters Patent, is—

An acetylene-gas generator composed of a stationary well and a gas-holder, adapted to float therein, the walls of said well being packed with a suitable non-conductor of heat and constructed to be filled with a fluid having a low freezing temperature, a water-receptacle submerged in said fluid, and contained within the well and holder, the walls of said receptacle also constructed to contain a material which is a poor conductor of heat, and a perforated receptacle for calcium carbid suspended from the holder and adapted to be dipped into the water as the gas is drawn off, in combination with a gasometer connected to the generator by a pipe with a self-lubricating valve located therein and operated by the float of the gasometer in such a way as to open the pipe when the float is down, thereby admitting gas from the generator.

Signed at Baltimore city, in the State of Maryland, this 2d day of October, A. D. 1897.

JAMES H. COUPER.
THOMAS A. BRYAN.

Witnesses:
M. R. JONES,
GEO. W. SMITH.